US006202093B1

(12) United States Patent
Bolam et al.

(10) Patent No.: US 6,202,093 B1
(45) Date of Patent: Mar. 13, 2001

(54) PUBLISH AND SUBSCRIBE DATA PROCESSING WITH ABILITY TO SPECIFY A LOCAL PUBLICATION/SUBSCRIPTION

(75) Inventors: Steven William Bolam, Eastleigh; Brian Clive Homewood, Winchester; Andrew Hickson, West Wellow; John Michael Knapman, Eastleigh; David Ware, Romsey, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,916

(22) Filed: Apr. 9, 1999

(30) Foreign Application Priority Data

Dec. 23, 1998 (GB) .................................................. 9828279

(51) Int. Cl.⁷ .................................................. G06F 15/173
(52) U.S. Cl. ............................ 709/225; 709/224; 706/62; 707/6; 707/1
(58) Field of Search ............................... 706/62; 709/224; 707/6, 7

(56) References Cited

U.S. PATENT DOCUMENTS

| 5,768,528 | 6/1998 | Stumm ............................ 395/200.61 |
| 5,867,799 | * 2/1999 | Lang et al. ............................ 707/1 |
| 5,983,214 | * 11/1999 | Lang et al. ............................ 707/1 |
| 5,987,460 | * 11/1999 | Niwa et al. ............................ 707/6 |
| 5,999,975 | * 12/1999 | Kittaka et al. ........................ 709/224 |
| 6,014,654 | * 1/2000 | Ariyoshi ................................. 706/62 |

FOREIGN PATENT DOCUMENTS 806731    11/1997   (EP) .

* cited by examiner

*Primary Examiner*—Zarni Maung
*Assistant Examiner*—Farzaneh Farahi
(74) *Attorney, Agent, or Firm*—Edward H. Duffield

(57) ABSTRACT

A publishing data processing method for use in a publish/subscribe data processing broker network having a plurality of broker data processing apparatuses each of which has an input for receiving published messages directly from a publisher application and/or receiving subscription data directly from a subscriber application, the method includes steps of: Publishing a message on a topic to a first broker data processing apparatus; and providing an indication as to whether the published data message is to be considered as local to the first broker apparatus. Also included are an analogous subscribing data processing method, an analogous broker data processing method, apparatuses and computer program products.

3 Claims, 4 Drawing Sheets

PUBLISH AND SUBSCRIBE DATA PROCESSING WITH ABILITY TO SPECIFY A LOCAL PUBLICATION/SUBSCRIPTION

FIELD OF THE INVENTION

The present invention relates to the field of data processing and more specifically to data processing which distributes messages from suppliers (called, hereinafter, "publishers") of data messages to consumers (called, hereinafter "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

One such publish/subscribe broker network which is currently in use, and which has been developed by the Transarc Corp. (a wholly owned subsidiary of the assignee of the present patent application, IBM Corp.) is shown in FIG. 1. Publishers 11 and 12 connect to the publish/subscribe broker network 2 and send published messages to broker network 2 which distributes the messages to subscribers 31, 32, 33, 34. Publishers 11 and 12, which are data processing applications which output data messages, connect to broker network 2 using the well known inter-application data connection protocol known as remote procedure call (or RPC). Each publisher application could be running on a separate machine, alternatively, a single machine could be running a plurality of publisher applications. The broker network 2 is made up of a plurality of distribution agents (21 through 27, which will also be referred to herein as "brokers") which are connected in a hierarchial fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams. Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe broker network architecture provides the advantage of central coordination of all published messages, since all publishers must connect to the same distribution agent (the root) in order to publish a message to the broker network hierarchy. For example, total ordering of published messages throughout the broker hierarchy is greatly facilitated, since the root can easily assign sequence numbers to each published message on a stream. However, this architecture also has the disadvantage of publisher inflexibility, since each publisher is constrained to publishing from the single root distribution agent, even when it would be much easier for a publisher to connect to a closer distribution agent.

Accordingly, publish/subscribe software designers are beginning to consider architectures where publishers are allowed to publish messages directly to any distribution agent in the broker network. This clearly has the advantage of removing the above-mentioned constraint on publishers. However, as with any tradeoff, it presents other problems. One of the major problems is that since a publisher can publish from any distribution agent, subscription data (data indicating which subscribers have subscribed to which streams/topics) must be propagated throughout the broker network, as it cannot be determined from where a publisher on a particular topic/stream will publish from. Propagating subscription data throughout the broker network is the only way (besides sending published messages to each distribution agent) to guarantee that published messages, from wherever they may be published, will make their way to the subscribers who have requested the messages. This requirement imposes a great strain on the broker network, as it not only presents a high data traffic level throughout the network but also the subscription data must be locally stored and maintained with respect to each distribution agent in the broker network.

Another problem with this latter publish/subscribe architecture is that since publishers are allowed to publish from any distribution agent in the network, it is very likely that a high rate of data traffic will exist on the network, since publications and subscriptions will flow between publishers and subscribers wherever they may be located in the network.

SUMMARY OF THE INVENTION

According to one aspect, the present invention provides a publishing data processing apparatus for use in a publish/subscribe data processing broker network having a plurality of broker data processing apparatuses each of which has an input for receiving published messages directly from a publisher application and/or receiving subscription data directly from a subscriber application, comprising: means for publishing a message on a topic to a first broker data processing apparatus; and means for providing an indication as to whether the published data message is to be considered as local to the first broker apparatus.

According to a second aspect, the present invention provides a data processing method having method steps corresponding to each element of the data processing apparatus of the first aspect of the invention.

According to a third aspect, the present invention provides a computer readable storage medium having a computer program stored on it which, when executed on a computer, carries out the functionality of data processing method of the second aspect of the invention.

According to a fourth aspect, the present invention provides a subscribing data processing apparatus for use in a publish/subscribe data processing broker network having a plurality of broker data processing apparatuses each of which has an input for receiving published messages directly from a publisher application and/or receiving subscription data directly from a subscriber application, comprising: means for entering a subscription on a topic to a first broker data processing apparatus; and means for providing an indication that the subscription is to be considered as local to the first broker apparatus.

According to a fifth aspect, the present invention provides a data processing method having method steps corresponding to each element of the data processing apparatus of the fourth aspect of the invention.

According to a sixth aspect, the present invention provides a computer readable storage medium having a computer program stored on it which, when executed on a computer, carries out the functionality of data processing method of the fourth aspect of the invention.

According to a seventh aspect, the present invention provides in a publish/subscribe data processing broker network having a plurality of broker data processing apparatuses each of which has an input for receiving published messages directly from a publisher application and/or receiving subscription data directly from a subscriber application, a first broker apparatus comprising: means for receiving via said input a data message published on a first topic by a first publisher application; means for receiving via said input subscription data on the first Topic from a first subscriber application; means for forwarding the received published data message to another broker apparatus; wherein at least one of: (a) the data message published on the first topic by the first publisher application; and (b) the subscription data on the first topic from the first subscriber application; includes an indication as to whether the published data message and/or subscription data is to be considered as local to the first broker apparatus; and wherein the first broker apparatus further includes blocking means responsive to said indication for blocking the forwarding of published data and/or subscription data when said indication indicates that the published data message and/or subscription data is to be considered as local to the first broker apparatus.

According to an eighth aspect, the present invention provides a data processing method having method steps corresponding to each element of the data processing apparatus of the seventh aspect of the invention.

According to a ninth aspect, the present invention provides a computer readable storage medium having a computer program stored on it which, when executed on a computer, carries out the functionality of data processing method of the eighth aspect of the invention.

The inventors have recognized that it would be very advantageous to be able to restrict the propagation of publications and subscription to avoid excessive traffic in the network. For instance, a publisher in Singapore may wish to prevent subscribers in New York from receiving certain publications that the publisher knows are inappropriate or would be expensive to ship. Conversely, a subscriber may want to avoid getting publications from distant locations.

Thus, the invention involves a publisher or subscriber providing an indication in the publication or subscription that the publication or subscription is local. When issued by a publisher, this indication means that the publication is only meant to be sent to subscribers who are communicating directly (i.e., not through another distribution agent) with the same broker that the publisher is communicating directly with. When issued by a subscriber, this indication means that the subscription is only meant to be satisfied by publishers who are communicating directly with the same broker that the subscriber is communicating directly with. An indication can also be provided that publications and/or subscription information is global, meaning that it is not to be limited to the local broker.

The invention thus provides a way to greatly limit the flow of unnecessary data in the form of publications and subscriptions in the network, while also providing publishers and subscribers with flexibility in their ability to limit their publications/subscriptions to a local setting (i.e., within the same broker).

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
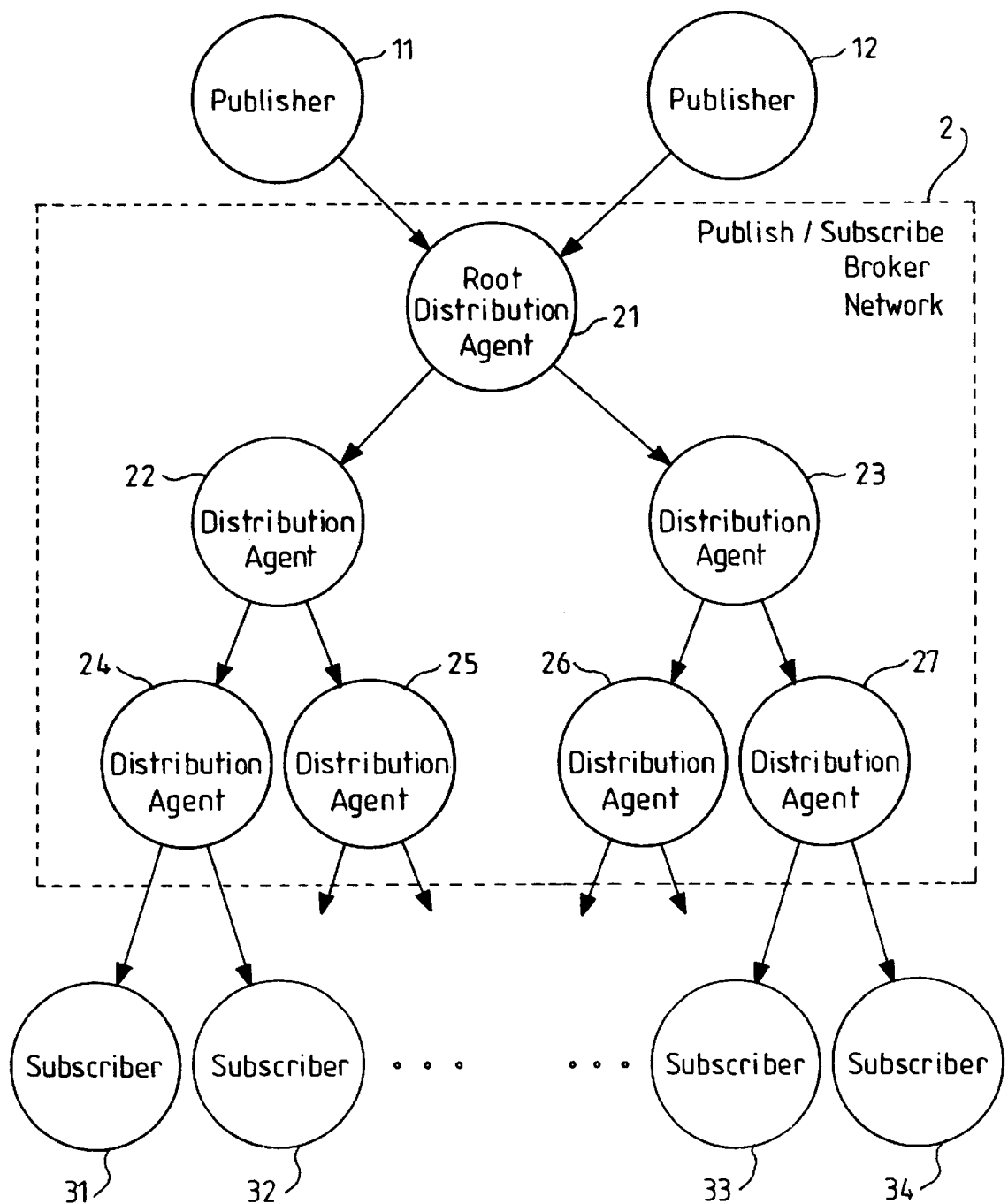
FIG. 1 shows the architecture of a prior art publish/subscribe broker network which was referred to above.

In the prior art FIG. 1 discussed above, a publisher application 11, running on one computer, is, for example, a supplier of live stock market data quotes. That is, publisher application 11 provides frequent messages stating the present value of share prices. In this example, publisher application 11 is publishing messages on a stream called "stock" which has already been configured in the broker network 2. As is well known, when publisher 11 wishes to publish a stock quote message to stream "stock", publisher 11 makes an RPC call to the root distribution agent 11 which is at the top level of the broker tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RFC calls being made between each successive circle in the diagram of FIG. 1 connecting publisher 11 and subscriber 32 (i.e., 11 to 21, 21 to 22, 22 to 24 and 24 to 32).

Figure 2:
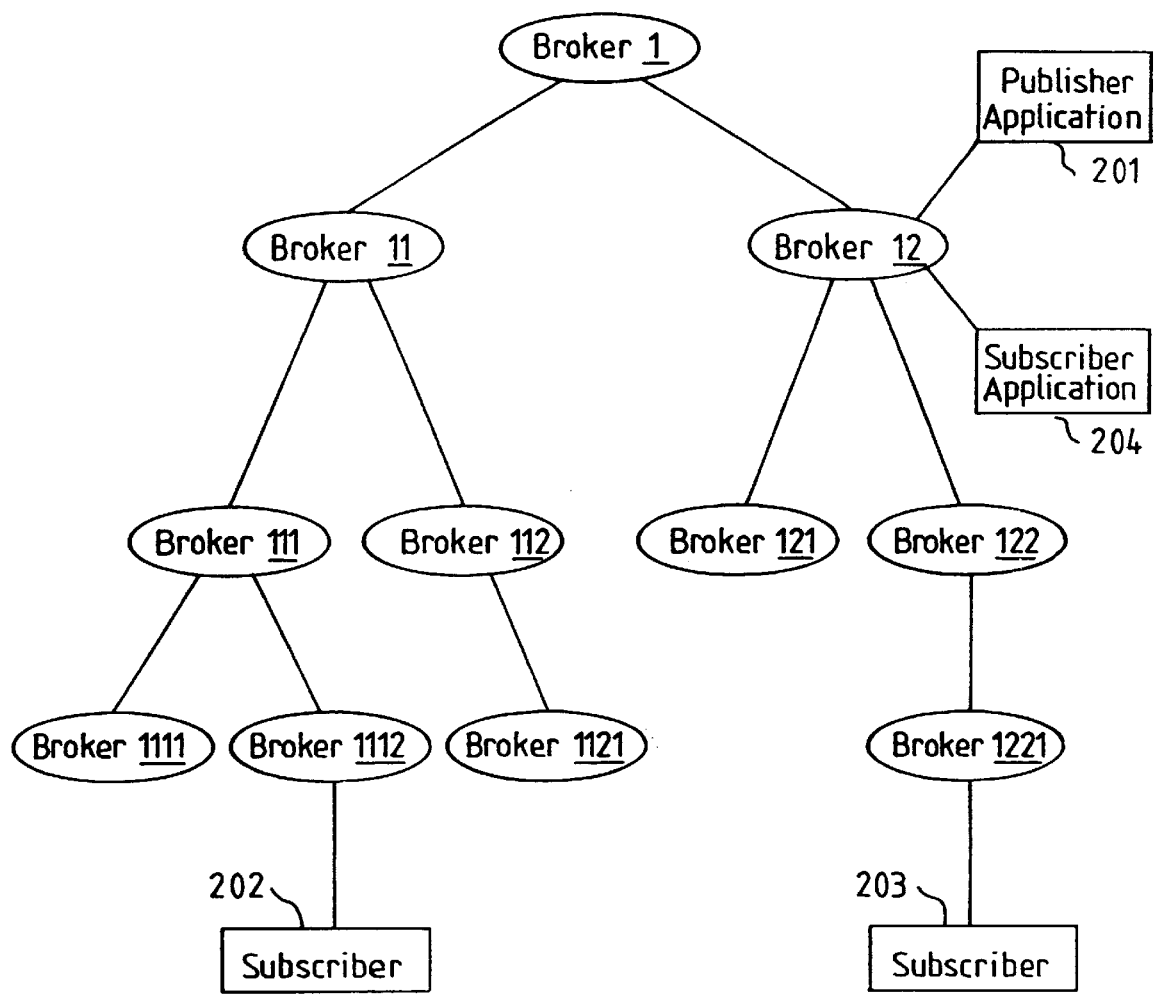
FIG. 2 shows the architecture of a publish/subscribe broker network according to which the preferred embodiment of the present invention will be explained below.

FIG. 2 shows a different publish/subscribe architecture where publisher applications can publish messages to the broker network by directly communicating with any one of a plurality of distribution agents (also referred to herein as "brokers"). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker network of their desire to receive such published messages. Since the publisher application 201 is allowed to communicate directly with any of a plurality of distribution agents, the subscription data entered by the subscriber applications must be propagated throughout the broker network to each broker shown in FIG. 2. This way, no matter which distribution agent the publisher application 201 happens to communicate directly with, the published messages will be able to be routed to the subscriber applications 202 and 203. As stated above, however, this creates a high performance overhead due to the excessive amounts of subscription data propagation traffic throughout the broker hierarchy and due to the need to have to maintain and store such subscription data locally at each distribution agent.

The preferred embodiment of the present invention allows publisher 201 to indicate that its published messages on a topic should only be distributed to subscribers (e.g., subscriber 204) which are directly communicating with broker 12. Publisher 201 does this by providing an indication in its published messages on a stated topic that such published messages should not be forwarded on to other brokers, since such messages are only meant to be delivered to subscribers like subscriber 204 which are directly communicating with broker 12. Such published messages are thus considered "local" with respect to broker 12.

Figure 3:
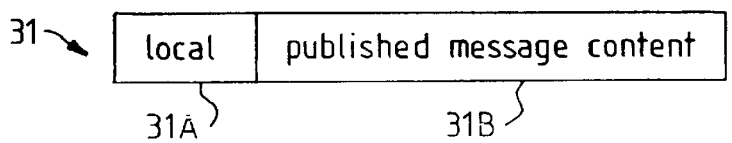
FIG. 3 shows the format of a published message according to a preferred embodiment of the present invention.

As shown in FIG. 3, a published message 31 includes a flag portion 31A and a data portion 31B. The data portion 31B includes the content of the published message (e.g., if the topic is IBM stock, the content of a published message might be that on Dec. 11, 1998, IBM stock is trading at $160 per share). The flag portion 31A includes a two-valued flag (e.g., a binary value) that the publisher can set to one value or the other.

One of the two values is "local" (as shown in FIG. 3) meaning that the published message is only intended for subscriber applications (e.g., 204) that are directly communicating with broker 12 (the same broker which publisher 201 is directly communicating with). More specifically, this means that the published message should not be forwarded to other brokers in the network. The second of the two values is "global" (not shown in FIG. 3) meaning that the published message should be propagated (i.e., forwarded) to other brokers.

Figure 5:
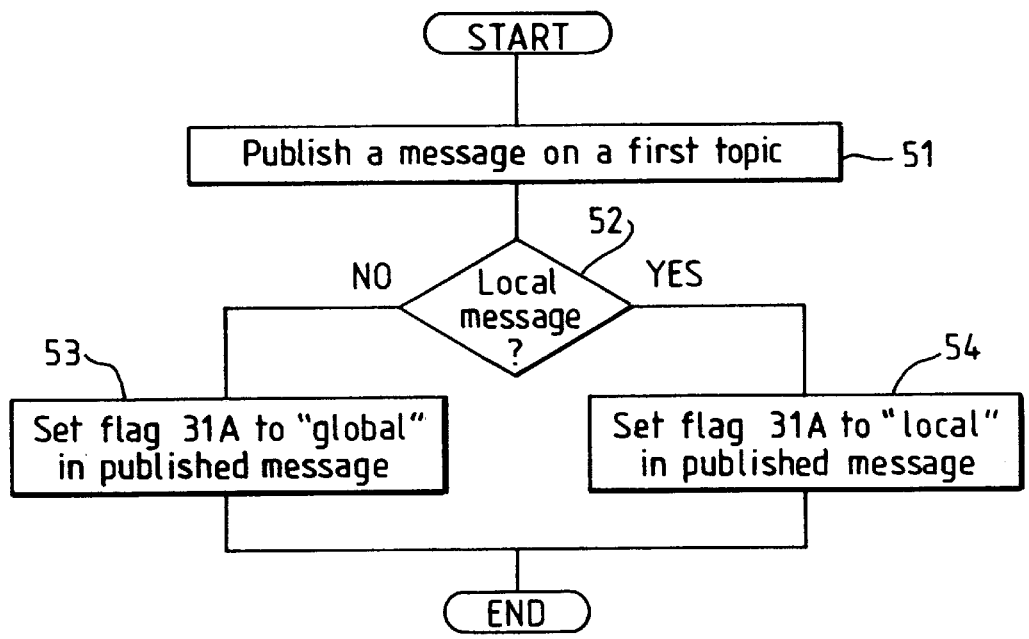
FIG. 5 is a flowchart showing the steps carried out by a publisher application, according to a preferred embodiment of the present invention.

As shown in the flowchart of FIG. 5, a publisher application 201 publishes (step 51) a message on a first topic (e.g. IBM stock). Before the published message is actually sent out to the broker 12, the publisher application 201 determines (step 52) whether the published message is to be considered "local" or "global" by the broker. If "local", the flag 31A is set to "local" (step 54) and if "global", the flag 31A is set to "global" (step 53).

This feature provides great flexibility to publisher applications, since publishers now have the choice of whether their published messages should be considered local or global. This also cuts down significantly on unnecessary network traffic, since published messages which are local in nature are constrained from being forwarded to other brokers.

The preferred embodiment of the present invention also allows a subscriber application (e.g., 204) to indicate that a subscription that it is currently registering is only a subscription for published messages by a publisher (e.g., 201) that is directly communicating with the same broker (e.g., 12) that the subscriber (e.g., 204) is directly communicating with. Subscriber 204 does this by providing an indication in its subscription data on a stated topic that the subscription should only be fulfilled by publishers (e.g., 201) which are directly communicating with the same broker (e.g., 12) which the subscriber 204 is directly communicating with. Such subscription data is thus considered "local" with respect to broker 12.

Figure 4:
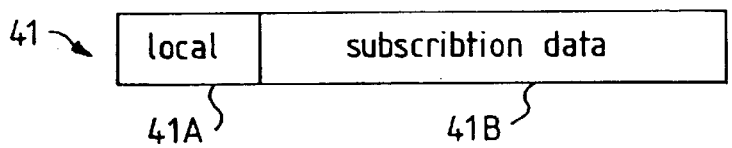
FIG. 4 shows the format of a subscription according to a preferred embodiment of the present invention.

As shown in FIG. 4, subscription data 41 includes a flag portion 41A and a data portion 41B. The data portion 41B includes the content of the subscription data (e.g., if the topic is IBM stock, the content of the subscription data would indicate that the subscriber 204 is interested in receiving published messages concerning the current value of IBM stock). The flag portion 41A includes a two-valued flag (e.g., a binary value) that the subscriber can set to one value or the other.

One of the two values is "local" (as shown in FIG. 4) meaning that the subscription data should only be satisfied by publisher applications (e.g., 201) that are directly communicating with broker 12 (the same broker which subscriber 204 is directly communicating with). More specifically, this means that the subscription data should not be forwarded to other brokers in the network. The second of the two values is "global" (not shown in FIG. 4) meaning that the subscription data should be propagated to other brokers.

Figure 6:
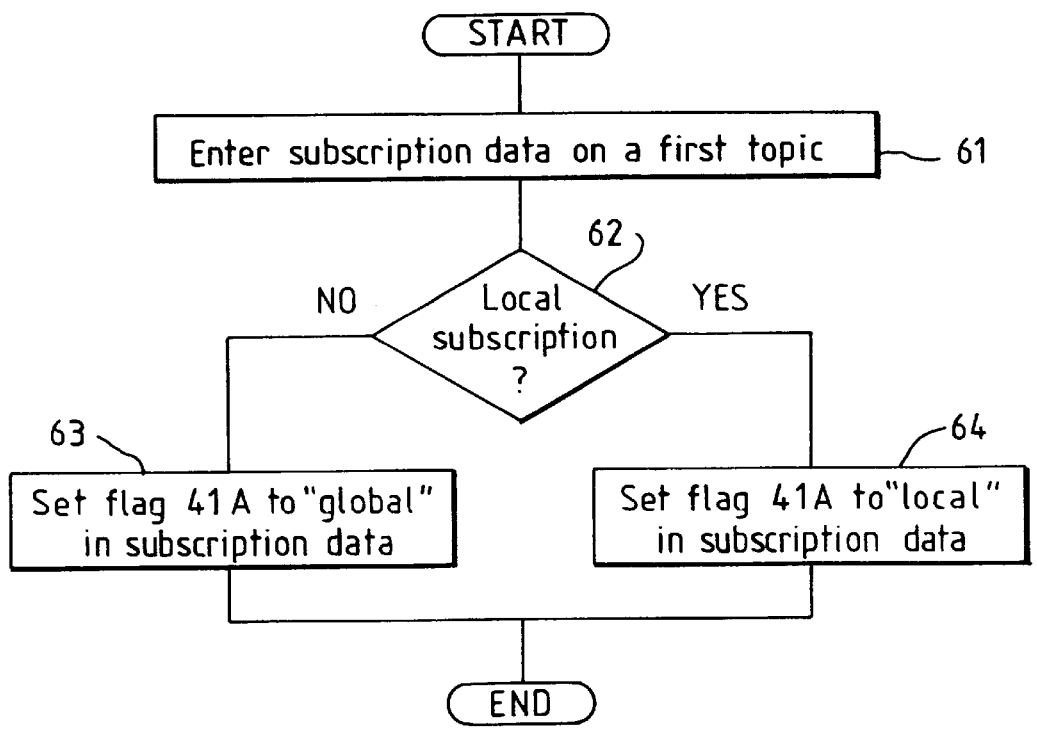
FIG. 6 is a flowchart showing the steps carried out by a subscriber application, according to a preferred embodiment of the present invention.

As shown in the flowchart of FIG. 6, a subscriber application 204 enters subscription data (step 61) on a first topic (e.g. IBM stock). Before the subscription data is actually sent out to the broker 12, the subscription application 204 determines (step 62) whether the subscription data is to be considered "local" or "global" by the broker. If "local", the flag 41A is set to "local" (step 64) and if "global", the flag 41A is set to "global" (step 63).

Figure 7:
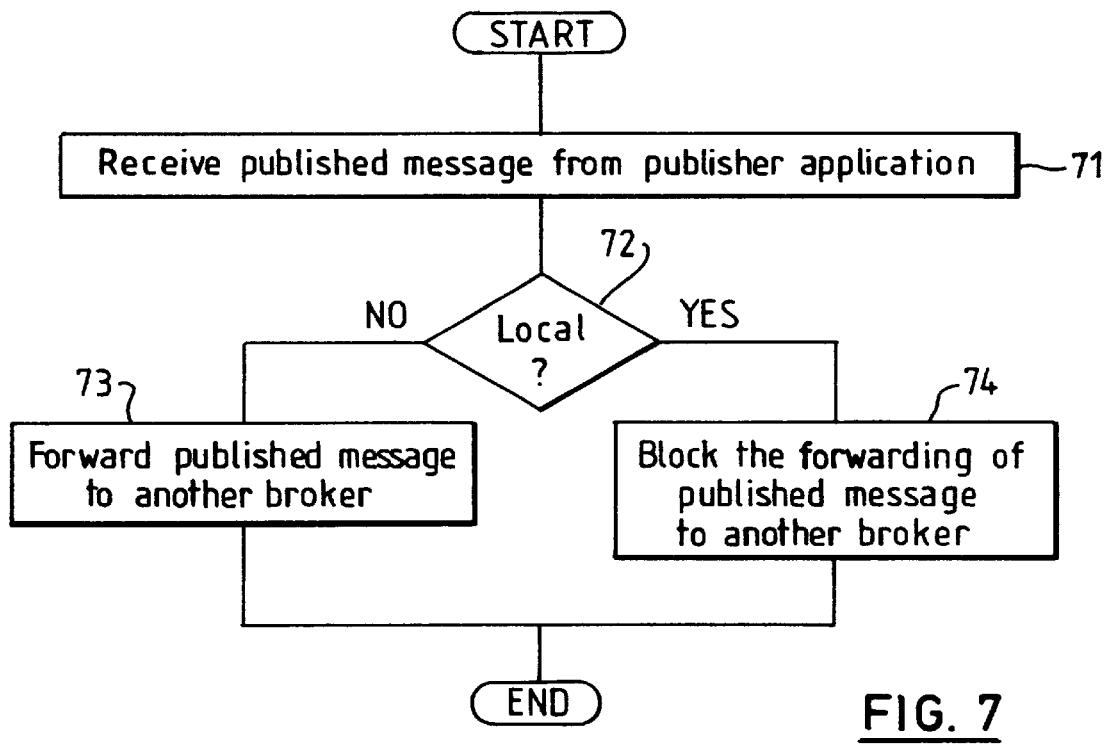
FIGS. 7 and 8 is a flowchart showing the steps carried out by a broker, according to a preferred embodiment of the present invention.

As shown in the flowchart of FIG. 7, a broker 12 receives a published message from a publisher application 201 (step 71). At step 72 the broker determines whether the received published message has the "local", flag set (31A) and if so, the broker blocks (step 74) the forwarding of the published message to another broker (e.g. broker 1). If, at step 72, the broker does not determine that a "local" flag is set, the published message is forwarded on to another broker.

Figure 8:
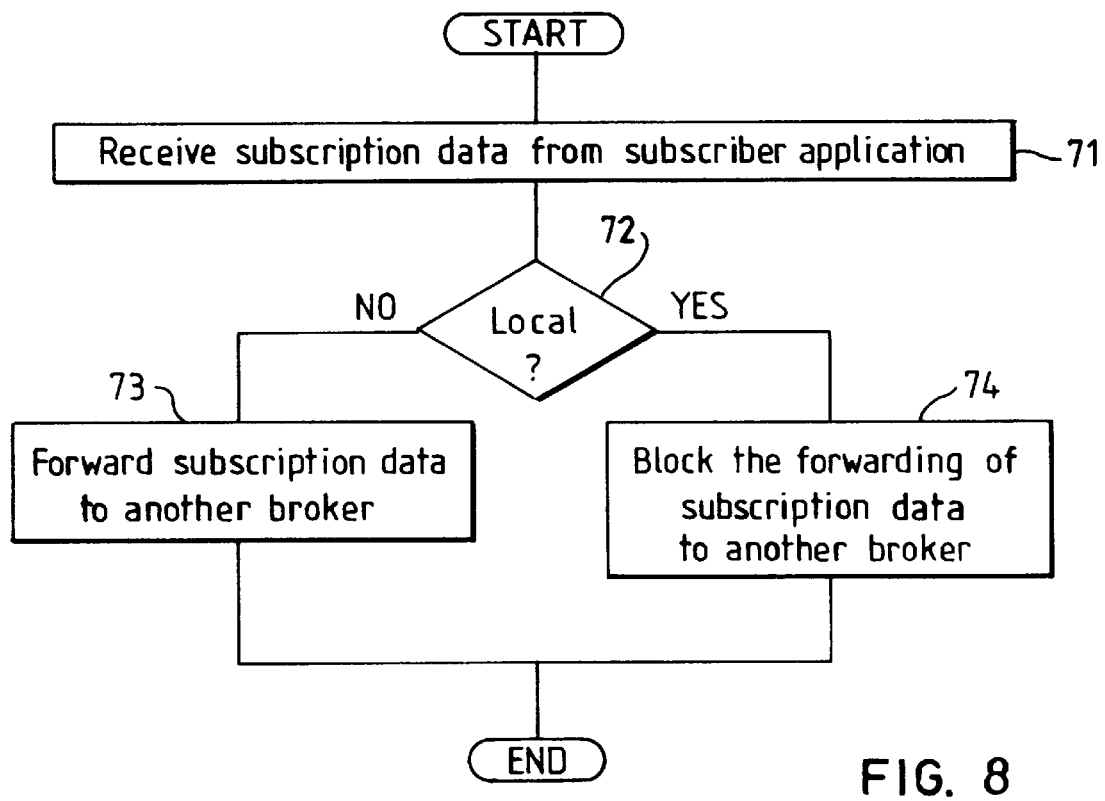

As shown in the flowchart of FIG. 8, a broker 12 receives subscription data from a subscriber application 204 (step 71) and determines (step 72) whether the subscription data has the "local" flag set (41A) and if so, the broker blocks (step 74) the forwarding of the subscription data to another broker (e.g. broker 1). If, at step 72, the broker does not determine that a "local" flag is set, the subscription data is forwarded on to another broker.

If publisher application 201 specifies that a publication on topic "IBM stock" is to be considered "global" by broker 12, then broker 12 will forward on the publication to other brokers in the network, in the case where at least one of these other brokers has registered a subscription for such messages. For example, broker 12 may forward the publication to broker 122. If broker 122 has a subscriber application 205 (not shown) communicating directly with it, and subscriber application 205 has registered a local subscription to broker 122 on the same topic, then the global publication from publisher 201 will not be sent to subscriber 205 because subscriber 205 has asked not to be sent such messages which do not originate at broker 12. However, in an alternative embodiment, a global publication issued by publisher 201 could be considered by the broker network as pertaining to all subscribers on the topic, whether or not the subscribers have previously indicated that they only want to receive local publications, meaning that subscriber 205 would get the messages published by publisher 201. The publish/subscribe software developers could make an unmodifiable choice as to which of the two possible implementations to use, or such developers could implement the software so that the choice could be left configurable by the systems administrator. Further, if a publisher at broker 122 should publish a global publication then the global publication will not be sent to subscriber 205 because subscriber 205 asked only to be sent local messages which originated at broker 122. However, in an alternative embodiment, a global publication issued by a publisher at broker 122 could be delivered to subscriber 205 if the 'local subscription' had been interpreted as a request to receive all matching publications originating at broker 122 (the local broker) regardless of the locality of the publication.

The use of a flag, as shown is not the only way a publisher or subscriber can indicate that data is to be considered local. For example, a publisher can simply publish a message stating that for a stated topic all future messages will be considered local publications, even though such future messages do not have their own dedicated indication that they are unique.

This feature provides great flexibility to subscriber applications, since subscribers now have the choice of whether their subscription data should be considered local or global. For example, it is possible that many remote publishers (i.e., ones that are directly communicating with brokers far away from where the subscriber application is located) could be publishing on the same topic which the subscriber has registered a subscription to, but the subscriber is not particularly interested in such remotely originating publications, and will probably delete them upon receipt. This involves much unnecessary network traffic and frustration on the part of the person at the subscribing end who has to sift through and delete the unwanted publications. This can now be easily avoided by the subscriber setting the "local" flag.

This also cuts down significantly on unnecessary network traffic in the form of subscription data, since subscription data which is local in nature is constrained from being forwarded to other brokers when a new subscription is entered into the broker network.

We claim:

1. In a publish/subscribe data processing broker network having a plurality of broker computer systems communicating with each other via the network each of which has an input for receiving published messages directly from a publisher application and/or receiving subscription data directly from a subscriber application, a first broker computer system comprising:

means for receiving via said input a data message published on a first topic by a first publisher application;

means for receiving via said input subscription data on the first topic from a first subscriber application;

means for forwarding the received published data message to another broker computer system;

wherein at least one of:

(a) the data message published on the first topic by the first publisher application; and (b) the subscription data on the first topic from the first subscriber application;

includes an indication as to whether the published data message and/or subscription data is to be considered as local to the first broker computer system; and wherein the first broker computer system further includes blocking means responsive to said indication for blocking the forwarding of published data and/or subscription data when said indication indicates that the published data message and/or subscription data is to be considered as local to the first broker computer system.

2. In a publish/subscribe data processing broker network having a plurality of broker computer systems communicating with each other via the network each of which has an input for receiving published messages directly from a publisher application and/or receiving subscription data directly from a subscriber application, a broker data processing method taking place within a first broker computer system comprising steps of:

receiving via said input a data message published on a first topic by a first publisher application;

receiving via said input subscription data on the first topic from a first subscriber application;

forwarding the received published data message to another broker computer system;

wherein at least one of:
- (a) the data message published on the first topic by the first publisher application; and
- (b) the subscription data on the first topic from the first subscriber application;

includes an indication as to whether the published data message and/or subscription data is to be considered as local to the first broker computer system; and wherein the method further includes a blocking step of, responsive to said indication, blocking the forwarding of published data and/or subscription data when said indication indicates that the published data message and/or subscription data is to be considered as local to the first broker computer system.

3. A computer program product stored on a computer readable storage medium for, when run on a computer system, instructing the computer system to carry out, in a publish/subscribe data processing broker network having a plurality of broker computer systems communicating with each other via the network each of which has an input for receiving published messages directly from a publisher application and/or receiving subscription data directly from a subscriber application, a broker data processing method taking place within a first broker computer system comprising steps of:

receiving via said input a data message published on a first topic by a first publisher application;

receiving via said input subscription data on the first topic from a first subscriber application;

forwarding the received published data message to another broker computer system;

wherein at least one of:
- (a) the data message published on the first topic by the first publisher application; and
- (b) the subscription data on the first topic from the first subscriber application;

includes an indication as to whether the published data message and/or subscription data is to be considered as local to the first broker computer system; and wherein the method further includes a blocking step of, responsive to said indication, blocking the forwarding of published data and/or subscription data when said indication indicates that the published data message and/or subscription data is to be considered as local to the first broker computer system.

* * * * *